Feb. 1, 1966     P. N. LEVESQUE     3,232,266
DIFFERENTIAL PRESSURE INDICATOR
Filed July 8, 1963    4 Sheets-Sheet 1

INVENTOR.
PAUL N. LEVESQUE
BY Joseph B Taphorn
ATTORNEY

Feb. 1, 1966  P. N. LEVESQUE  3,232,266
DIFFERENTIAL PRESSURE INDICATOR
Filed July 8, 1963  4 Sheets-Sheet 2

INVENTOR.
PAUL N. LEVESQUE
BY Joseph B Taphorn
ATTORNEY

Feb. 1, 1966 P. N. LEVESQUE 3,232,266
DIFFERENTIAL PRESSURE INDICATOR
Filed July 8, 1963 4 Sheets-Sheet 4

INVENTOR.
PAUL N. LEVESQUE
BY *Joseph B Taphorn*
ATTORNEY

United States Patent Office 3,232,266
Patented Feb. 1, 1966

3,232,266
DIFFERENTIAL PRESSURE INDICATOR
Paul N. Levesque, Bristol, Conn., assignor to Altair Inc., Terryville, Conn., a corporation of New York
Filed July 8, 1963, Ser. No. 293,498
2 Claims. (Cl. 116—70)

This invention relates to differential pressure indicating devices, and more particularly to such a device having improved shock resistance.

Differential pressure indicating devices are utilized to indicate an excessive pressure drop over elements such as filters. For example, when a filter becomes clogged by excessive contamination, the flow of fluid therethrough is impaired and the downstream pressure drops with respect to the upstream pressure. A differential pressure indicating device will signal when the pressure differential exceeds a predetermined amount.

Prior art devices, while capable of indicating the clogged condition of a filter, have also indicated such a condition when the device was subjected to excessive shock or vibration. This false indication results in unnecessary filter replacement, unnecessary work, or if the device operates an electrical switch, in unnecessary shutdown of the apparatus embodying the filter.

Accordingly, the object of the invention is to provide a differential pressure indicating device which does not provide a false signal when subjected to severe shock or vibration.

The invention resides in the utilization of the scientific principle that the force of magnetic attraction varies inversely as the square of the distance separating the magnetically attracted elements. Accordingly, two magnetically attracted elements displaceable with respect to one another as a pressure differential exceeds a predetermined amount are so designed and mounted with respect to one another as to accommodate a limited amount of displacement without the force of magnetic attraction falling off to where the force of a spring tending to separate the elements predominates.

These and other objects, features, and advantages of the invention will become apparent from a reading of the following specification when considered with the accompanying drawings wherein.

Figure 2:
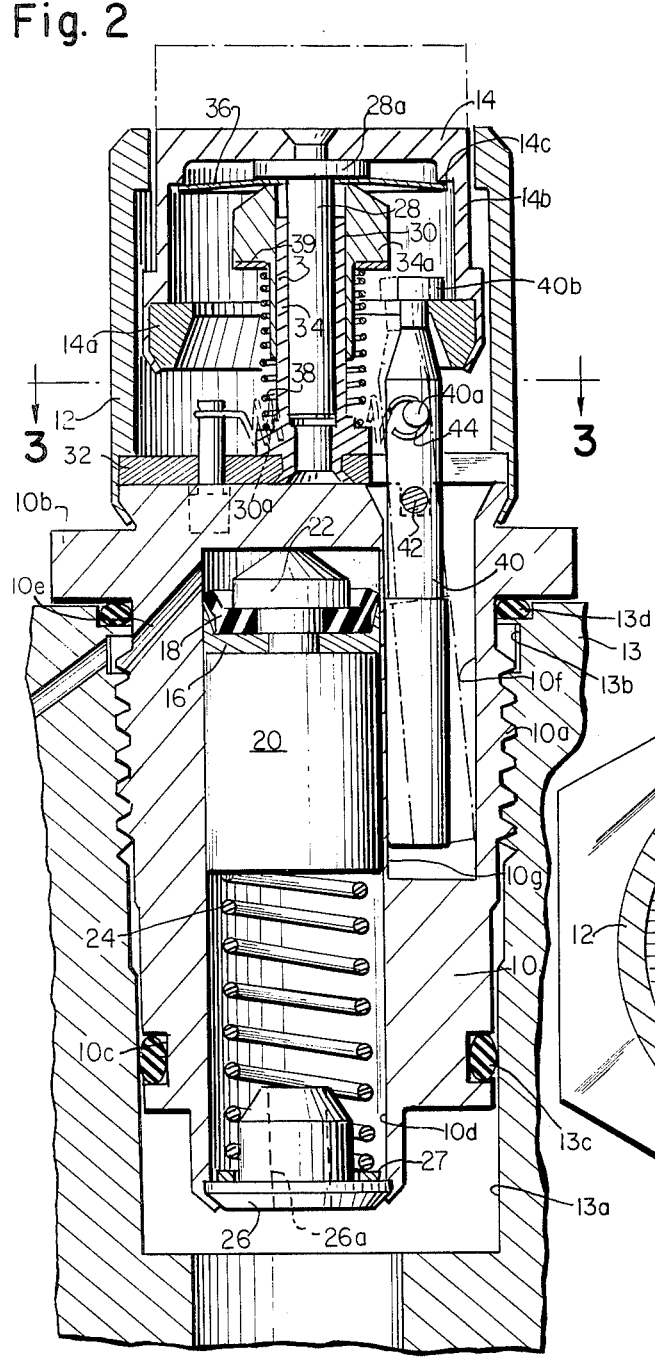
FIG. 2 is a sectional view on an enlarged scale taken along the line 2—2 of FIG. 1.
Figure 1:
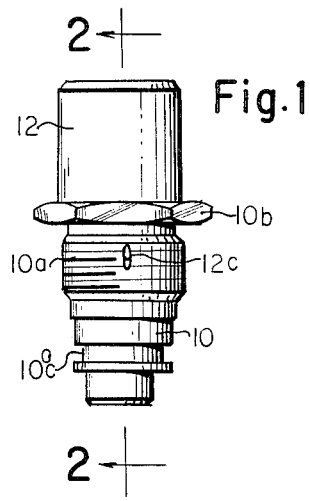
FIG. 1 is a view of one differential pressure indicating device embodying the invention.
Figure 3:
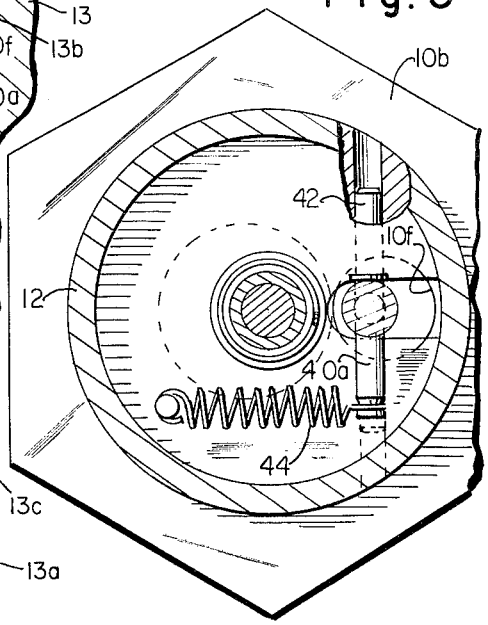
FIG. 3 is a sectional view of the whole device as along a line 3—3 suggested in FIG. 2.

Referring now more particularly to the embodiment of FIGS. 1–3, a differential pressure indicating device is indicated as including a generally tubular body 10 of non-magnetic material, an open ended cap 12 secured at its lower end to the body as by crimping, and a signal button 14 in the open end of the cap 12. The button 14 is movable outwards to the dotted line position to signal that a pressure differential exceeding a predetermined amount has occurred.

The tubular body 10 is externally threaded at 10a and provided with a hexangularly sided integral ring 10b. The ring 10b facilitates securing the pressure indicating device in a threaded opening 13a, in a casing 13. The bottom of such an opening 13 would be in communication with the downstream side of a filter while an annular groove 13b in the side of the opening would be in communication with the upstream side of a filter. Accordingly, an annular groove 10c would be formed in the lower end of the body 12 to seat a seal such as an O ring 13c to isolate the downstream pressure from the upstream pressure. Further, a seal such as an O ring 13d would be mounted about the tubular body underneath the annular ring 10b to cooperate with the surface of the casing to prevent the escape of fluid from the opening.

An off-center cylindrical bore 10d is formed in the body 10 so as to extend to its lower end but terminate short of its upper end. It mounts the pressure responsive mechanism of the device.

The pressure responsive mechanism includes a piston 16 mounting a seal 18 on its upper side. The lower side of the piston mounts a permanent magnet 20. The seal 18 is mounted on the piston 16 by a large headed part 22 extending through the seal and crimped to the piston. The magnet 20 is mounted on the piston by an adhesive such as epoxy resin. The large head of the part 22 engages the upper end of the cylindrical bore 10d to provide the spacing desirable for the application of fluid pressure to the upper side of the piston. A conduit 10e would communicate the upper end of the cylinder with the upstream pressure in the annular ring which would be formed in a using casing's opening. A compression spring 24 reacts between the lower side of the piston 16 through the magnet 20 and a seat or spring retainer 26 suitably mounted in the lower end of the body 10. The seat is apertured at 26a to enable the application of fluid pressure from the downstream side of the filter to the piston 16. It also acts as a stop to prevent magnet overtravel.

It should be apparent that the pressure responsive mechanism will normally rest with the piston in its upper position in which the part 22 engages the upper end of the cylindrical bore 10d, because of the action of the spring 24. When the forces acting upon the piston 16 from the upstream side exceed those from the downstream side by the amount of the spring force, the piston including the magnet will move to the lower end of the cylindrical bore 10d. Obviously, by simply changing the spring to one of another strength, different pressure differentials can be employed to operate the pressure responsive mechanism. Washers 27 may also be used to vary the spring pressure.

The signal button 14 is slidably supported inside the cap 12 upon the upper end of the body 10. To this end it is secured to the upper end of a shouldered post 28. The post is slidably received in the upper end of a sleeve 30 rigidly mounted at its lower end upon a plate 32 anchored to the upper side of the body 10 by a shoulder 12b in the lower edge of the cap 12. Surrounding the sleeve 30 and slidably mounted thereon is a second sleeve 34 formed with a shoulder 34a at its upper end. The upper end of sleeve 34 is adapted to engage a disc 36 loosely fitting the post 28 underneath its shoulder 28a. A compression spring 38 reacts between one or more washers 39 on the underside of the sleeve shoulder 34a and a shoulder 30a on the lower end of the fixed sleeve 30. Thus the signal button 14 is urged outwardly by the spring 38 through the slidable sleeve 34, the disc 36, and the post 28. The post, being slidably, yet snugly, mounted in the fixed sleeve 30, guides the movement of the signal button 14.

The signal button is normally restrained from outward movement by a latching mechanism controlled by the pressure responsive mechanism. The latching mechanism includes a lever 40 of magnetic material. The lever's lower end extends into a bore 10f formed in one side of the upper end of the body 10. A thin wall 10g separates the bore 10f from the bore 10d containing the magnet 20 so that the magnet 20 may attract and hold the lower end of the lever 40 to the wall 10g.

The lever 40 is pivoted at an intermediate point to a pin 42 mounted in the upper end of the body 10 and across the bore 10f. A tension spring 44 reacts between a stud 40a mounted on the upper half of the lever 40 and a stud 46 secured to the upper side of the body 10 and extending through a suitable aperture in the plate 32 which it suitably locates and holds against rotation. The spring 44 urges the lever 40 in a counterclockwise direction as seen in FIG. 2, and hence will pivot the lever when its effective force about the pin 42 exceeds the force attracting the lever to the magnet 20.

The upper end of the lever 40 carries a latching shoulder 40b. This shoulder cooperates with an annular ring 14a carried inside the lower end of a depending skirt 14b of the signal button 14. Normally, the lever shoulder 40b overlies the annular ring 14a to hold the signal button 14 from being pushed out by the spring 38.

In operation, the differential pressure responsive device would normally have its pressure responsive mechanism in the upper end of the bore 10d, the lever 40 against the wall 10g under the attraction of the magnet 20, and the signal button 14 in under the latching action of the lever shoulder 40b. Severe shock and vibration would not affect the ability of the magnet 20 to hold the lever 40 to the wall 10g because the magnet can undergo considerable displacement without affecting its magnetic distance from the lever and hence its holding force.

On the other hand, should a predetermined pressure differential arise to create a force exceeding the spring force upon the piston 18, the piston and the magnet 20 would move to the lower end of the bore 10d. Now, the magnetic distance between the magnet and the lever 40 would have been increased to where the force of the spring 44 was sufficient to pivot the lever 40 counterclockwise. Lever shoulder 40b would now be withdrawn from over the annular ring 14a and the signal button 14 would move out to the dotted line position of FIG. 2.

Once the cause for the pressure differential is removed, the pressure responsive mechanism returns to the upper end of the bore 10d and the magnet 20 again attracts the lever 40 to the wall 10g. Now, when the signal button 14 is pushed in, a camming surface on the underside of the ring 14a will deflect the lever 40b to permit its downward passage. As soon as the ring is below the lever shoulder 40b, the lever will pivot clockwise to place the lever shoulder 40b over the ring, under the action of the magnet 20.

Filters show excessive pressure drops at lower temperatures because of fluid viscosity and not necessarily because of contamination. A feature of the invention is that false signals can be prevented by making the disc 36 of a bi-metallic material. At normal temperatures, the disc is bowed as shown in FIG. 2. At low temperatures, it would be bowed the other way. In flexing to this condition, the outer edges of the disc 36 would react against the shoulder 14c of the signal button 14 to force the sleeve 34 downward against the bias of the spring 38. This would place the shoulder 34a and/or the washer 39 opposite the shoulder 40b of the lever 40 to prevent the spring 44 from pivoting the lever 40 to unlatching position. Hence, the signal button 14 would not indicate an excessive pressure drop even though the pressure drop because of the highly viscous fluid forced the magnet 20 to the bottom of the bore 10d. The number and/or size of washers 39 are chosen for achieving accurate displacement for calibrating the temperature lockout.

Figure 4:
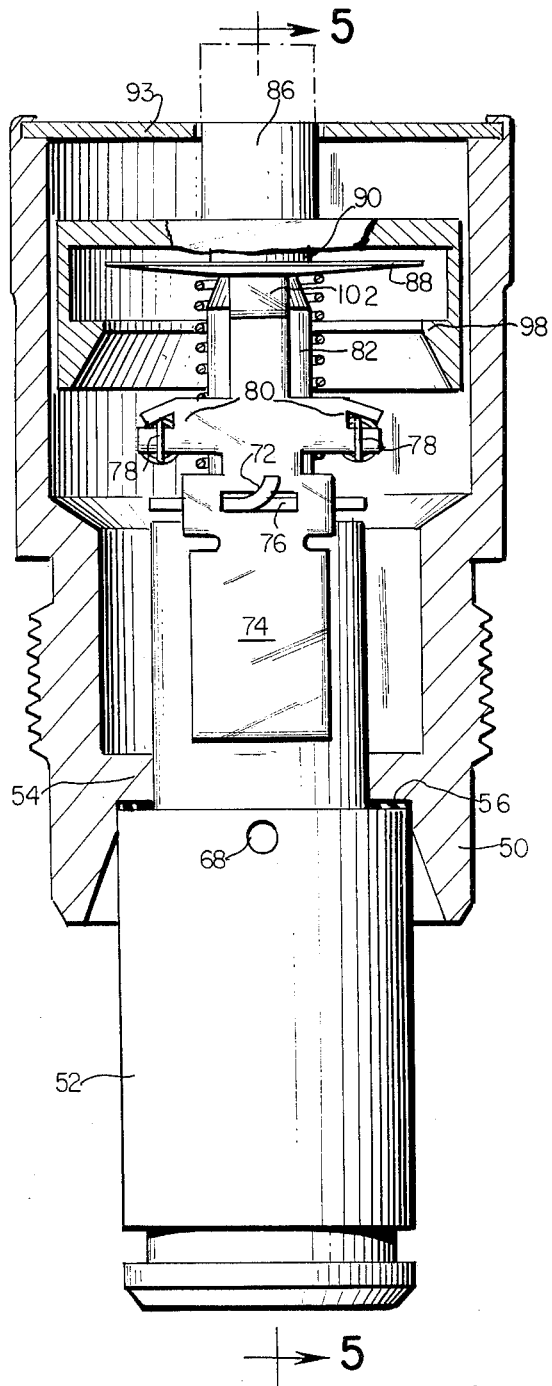
FIG. 4 is a vertical view, partially in cross-section, of another embodiment of the invention.
Figure 5:
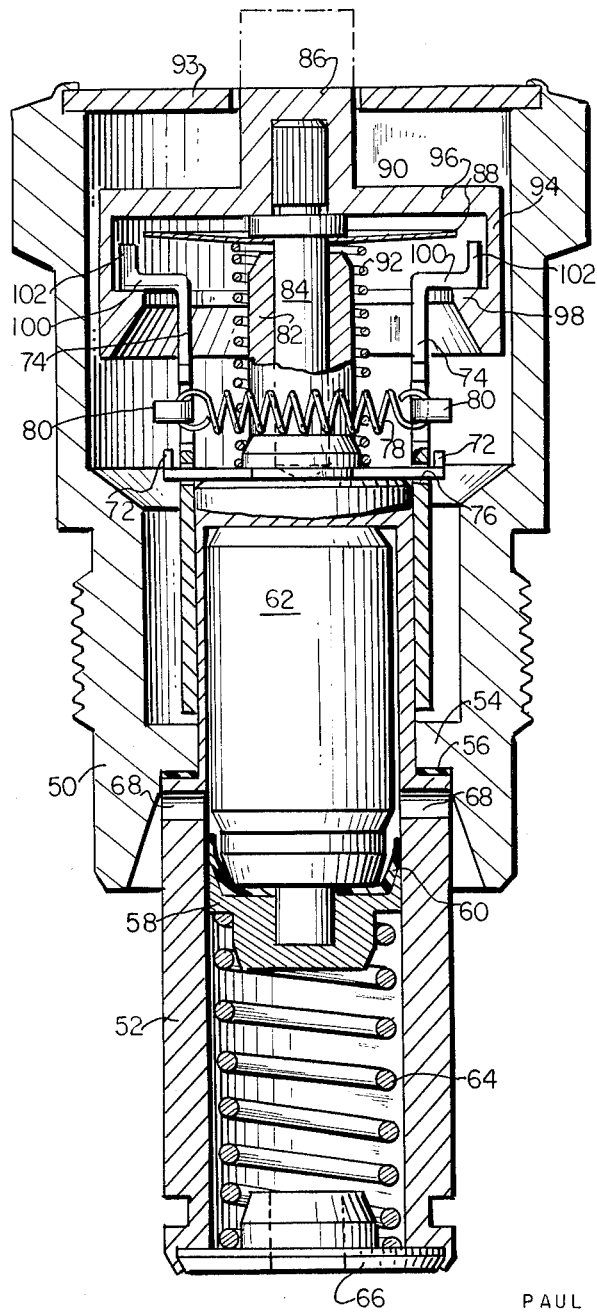
FIG. 5 is a sectional view taken along the line 5—5 of FIG. 4.
Figure 6:
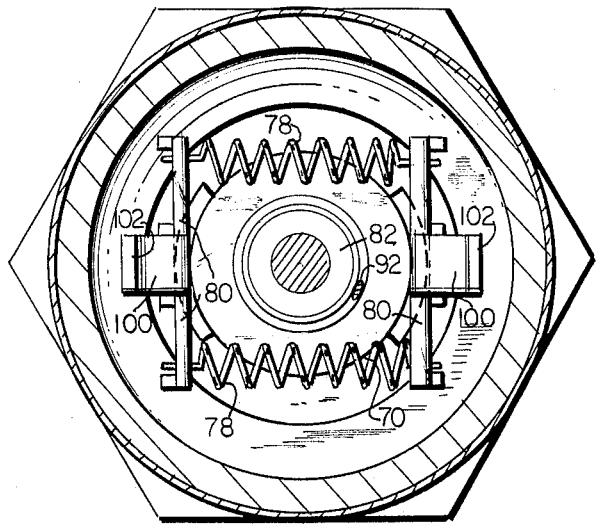
FIG. 6 is a top view of the device shown in FIG. 5 with certain parts removed.

Referring now to the embodiment of FIGS. 4, 5, and 6, the pressure differential indicator shown includes a generally tubular housing 50 brazed to a generally tubular body 52 formed of magnetically permeable material. An annular boss 54 in the housing 50 tightly grips a reduced portion of the tubular body 52 and a shoulder on the body abuts in sealing relationship the lower side of the boss 54 through a brazing ring 56.

The interior of the tubular body is a cylindrical chamber closed at its upper end. A piston 58 mounting a flexible seal 60 is slidably disposed in the chamber and carries a permanent magnet 62 loosely fitting in the chamber. A compression spring 64, reacting between the underside of the piston and an apertured seat 66 crimped onto the bottom end of the tubular body 52, urges the piston and magnet upwards in the cylindrical chamber to a normal position in which the magnet engages the closed upper end of the tubular body 52. Openings 68 in the enlarged portion of the tubular body permit the application of upstream fluid pressure to the upper side of the piston to work against the compression spring 64 and downstream pressures. The aperture in the seat or spring retainer 66 would communicate the cylindrical chamber below the piston 58 with downstream fluid pressures.

A plate 70, secured as by "snapping" it into a small groove 71 formed in the lower end of a tubular boss 82 made integrally on the upper end of the tubular body 52, bears a pair of outwardly and upwardly turned ears 72. The ears, in turn, support and form the pivot point for a pair of levers 74 through slots 76 (FIG. 4) therein. The levers 74 are formed of magnetically attracted material so that when the magnet 62 is in its upward and normal position, the levers are attracted and held to the side of the tubular housing 52. A pair of tension springs 78, anchored between corresponding laterally extending ears 80 on the levers 74, are operative to pivot the levers if the piston 58 and hence the magnet 62 are driven to the other end of the cylindrical chamber in the body 52.

The tubular boss 82 is upwardly opening. Slidably received within the boss 82 is the lower end of a pin 84 fixed at its upper end in a button 86. A convex disc 88, concave upwards at normal temperatures, is disposed about the pin 84 between the upper end of the boss 82 and a collar 90 on the pin 84. A compression spring 92 acts upon the disc 88, and through it upon the collar 90 and the button 82 to urge the latter to the dotted line position (FIGS. 4 and 5) wherein it is stopped by the apertured plate 93.

The button 86 is formed integral with a cylindrical element 94 through a radially extending flange 96. The inside of the cylindrical element 94 is formed with an annular shoulder 98. The shoulder 98 is normally engaged by laterally extending ends 100 on the upper ends of the levers 74. The underside of the annular shoulder 98 slopes outwardly and forms a camming surface operative to steer the upper ends 100 of the levers 74 inwardly in case the levers have been restored to normal position by the presence of the magnet 62 in its normal position.

The laterally extending ends 100 on the levers 74 have upturned ears 102. Normally, the ears will clear the disc 88. However, at low temperatures, the disc will be flexed so as to be concave downwards, and in this position will lie in the path of travel of the ears 102. Thus the levers 74 will be restrained from pivoting at low temperatures and the button 86 will not be released for outward movement.

The operation of the embodiment of FIGS. 4–6 is similar to that of FIGS. 1–3. Normally, the pressure differential between the upstream fluid applied to the upper side of the piston 58 through the openings 68 and the downstream fluid applied to the lower side of the piston through the aperture in the seat 66 does not result in a force sufficient to override the force of the spring 64. When a sufficient differential arises, the piston will move downward to the bottom of the body 52, taking the magnet 62 with it. The force of the spring 78 will now override the influence of the magnet 62 on the levers 74 and pivot them, provided the temperature is normal and the disc 88 is not flexed downwards. Pivoting of the levers 74 will release the signalling button 86 to move to its outward position. After the reason for the large pressure differential has been corrected, presumably the piston 58 and magnet 62 will be restored to their normal position. The magnet will thus regain control of the levers 74 and move them in against the body 52. Now when the button 86 is restored, the levers 74 will be momentarily pivoted by the camming action of the shoulder 98 on the ears 102. As soon as the shoulder passes below the laterally ending ends 100, the magnet 62 will rotate the levers 74 back against the body 52.

Figure 7:
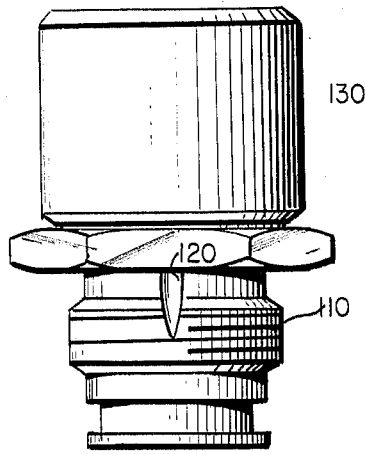
FIG. 7 is a view of still another embodiment of the invention.
Figure 8:
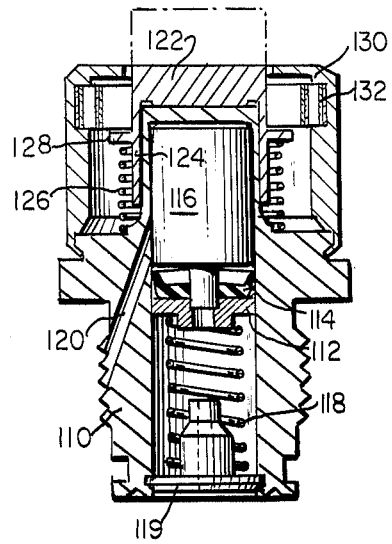
FIG. 8 is a sectional view taken along the line 8—8 of FIG. 7.

In the modification of FIGS. 7 and 8, a generally tubular housing 110 of magnetically permeable material is bored to provide a cylindrical chamber having a piston 112 carrying a flexible sealing element 114. A loose fitting permanent magnet 116 is attached to the piston 112 for movement therewith. A compression spring 118, reacting between the underside of the piston 112 and an apertured seat 119 held in position by the lower end of the housing 110 across the open end of the cylindrical chamber, biases the piston upward to its normal position in which the magnet engages the closed upper end of the cylindrical chamber. An opening 120 would communicate the cylindrical chamber area above the piston 112 with the upstream side of a fluid pressure system. The cylindrical chamber area below the piston would communicate with the downstream side of a fluid pressure system through the aperture in the seat or spring retainer 119.

A signalling button 122 is provided with a depending cylindrical extension 124 which slidably embraces the upper end of the housing 110. A compression spring 126 engages a laterally extending ring 128 on the button extension 124 to bias the button towards the dotted line signalling position. Normally, the dotted line position of the button 122 is determined by the engagement of the ring 128 with an apertured cover 130 crimped to the housing 110. At low temperatures, a coiled thermostatic element 132 is flexed to where its inner end lies athwart the path of outward movement of the ring 128.

In use, when the pressure differential between the upstream and downstream fluids exceeds a predetermined amount, the piston 112 will move to the lower end of the cylindrical chamber in the housing 110 and carry the magnet with it. In this extreme position, the magnet 116 will have passed beyond the lower end of the signal button extension 124 to where its attractive force upon the extension is exceeded by the force of the spring 126. The signal button 122 will then be moved to the dotted line position determined by the engagement of the ring 128 with the cover 130. Of course, if low temperatures prevailed, the outward movement would have been interrupted by the thermostatic element 132. In this case, as the fluid system warmed up and fluid viscosity decreased, the pressure differential would decrease and the spring 118 would restore the piston 112 and magnet 116 to normal position in the upper end of the cylindrical chamber. Because the cylindrical extension 124 would still be alongside the magnet to some extent and separated by a distance below the critical maximum, the force of magnetic attraction of the magnet upon the signalling button would exceed the force of spring 126 and draw the button down tightly upon the upper end of the tubular housing 110. When the button does move to the dotted line position, it will usually be pressed in after the system pressure situation has been corrected and the magnet 116 is in normal position and held thereby. If pressed in before the magnet is restored, the button will move right back out to the dotted line position when released.

It will be evident then that there has been developed a number of pressure differential indicators which are relatively immune to shock and vibration. In each indicator, the magnet can move a considerable distance before it loses control of the signalling button. Accordingly, false signals are practically eliminated. A thermostatic element would prevent false signals at low temperatures. Moreover, the pressure differential indicators retain all of the advantages of prior art devices.

While there have been shown and described several embodiments of the invention, it will be apparent that still other embodiments of the invention may be had without departing from the spirit of the invention as set forth in the following claims.

What is claimed is:

1. In a pressure differential indicator, a cylinder of magnetically permeable material, a piston in said cylinder, a permanent magnet loosely fitting in said cylinder and fixed to said piston, a spring biasing the piston and magnet to one end of said cylinder, means for communicating the one end of the cylinder to the upstream side of a fluid pressure system, means for communicating the other end of the cylinder to the downstream side of the fluid pressure system, a lever formed of magnetically attractable material and pivoted so that in normal position a portion thereof lies along the cylinder at its one end and in which position it is held by the magnet when generally in the one end of the cylinder, an offset on the other portion of the lever, a spring biasing the lever from the normal position and operative to pivot the lever when the magnet is in the other end of the cylinder, a signal button, a spring biasing the button outwards, and a shoulder carried by said button and normally disposed behind the lever offset, the lever when pivoted by the spring swinging the offset out of the path of the button shoulder.

2. In a pressure differential indicator, a cylinder of magnetically permeable material, a piston in said cylinder, a permanent magnet loosely fitting in said cylinder and fixed to said piston, a spring biasing the piston and magnet to one end of said cylinder, means for communicating the one end of the cylinder to the upstream side of a fluid pressure system, means for communicating the other end of the cylinder to the downstream side of the fluid pressure system, a pair of levers formed of magnetically attractable material and pivoted so that in normal positions portions thereof lie along opposite sides of the cylinder at its one end and in which positions they are held by the magnet generally in the one end of the cylinder, an offset on the other portion of each lever, a pair of springs biasing the levers from their normal positions and operative to pivot the levers when the magnet is in the other end of the cylinder, a signal button, a spring biasing the button outwards, and a shoulder carried by said button and normally disposed behind the lever offsets, the levers when pivoted by the springs swinging the offsets out of the path of the button shoulder.

References Cited by the Examiner

UNITED STATES PATENTS

| 971,423 | 9/1910 | Walters | 292—201 |
|---|---|---|---|
| 2,475,226 | 7/1949 | Ellis | 292—201 |
| 2,942,572 | 6/1960 | Pall | 116—70 |
| 3,052,206 | 9/1962 | Scavuzzo | 116—70 |
| 3,064,618 | 11/1962 | Scavuzzo | 116—70 |
| 3,070,232 | 12/1962 | Casaleggi | 210—90 |
| 3,077,176 | 2/1963 | Pall et al. | 116—70 |
| 3,125,062 | 3/1964 | Raupp et al. | 116—70 |
| 3,128,743 | 4/1964 | Whiting | 116—70 |

LOUIS J. CAPOZI, *Primary Examiner.*